US011873754B2

(12) United States Patent
Alexander et al.

(10) Patent No.: US 11,873,754 B2
(45) Date of Patent: Jan. 16, 2024

(54) MULTIPLE CYLINDER ENGINE

(71) Applicant: Impact Consulting and Engineering LLC, Naples, FL (US)

(72) Inventors: Gus Alexander, Inverness, IL (US); Richard J. Gilpatrick, Burlington, WI (US); Jeffrey Coughlin, Cross Plains, WI (US); James Lowell McNaughton, Jr., Mooresville, NC (US)

(73) Assignee: IMPACT CONSULTING AND ENGINEERING LLC, Naples, FL (US)

( * ) Notice: Subject to any disclaimer, the term of this patent is extended or adjusted under 35 U.S.C. 154(b) by 0 days.

(21) Appl. No.: 17/720,757

(22) Filed: Apr. 14, 2022

(65) Prior Publication Data

US 2022/0333522 A1 Oct. 20, 2022

Related U.S. Application Data

(60) Provisional application No. 63/175,258, filed on Apr. 15, 2021.

(51) Int. Cl.
*F02B 1/04* (2006.01)
*F02B 75/20* (2006.01)
*F02B 75/18* (2006.01)

(52) U.S. Cl.
CPC ................ *F02B 1/04* (2013.01); *F02B 75/20* (2013.01); *F02B 2075/1808* (2013.01)

(58) Field of Classification Search
CPC .......... F02B 1/04; F02B 75/20; F02B 75/007; F02B 75/18; F02B 75/1896; F02B 53/00;
(Continued)

(56) References Cited

U.S. PATENT DOCUMENTS

2004/0226523 A1* 11/2004 Kreuter ............... F02B 75/1896 123/51 A
2004/0255882 A1 12/2004 Branyon et al.
(Continued)

OTHER PUBLICATIONS

International Search Report and Written Opinion issued in related Application Serial No. PCT/US2022/024990 dated Jul. 18, 2022.

*Primary Examiner* — Grant Moubry
(74) *Attorney, Agent, or Firm* — Brian J. Colandreo; Jeffery T. Placker; Holland & Knight LLP

(57) ABSTRACT

An internal combustion engine may include a first piston reciprocatingly disposed in a first cylinder, and a second piston reciprocatingly disposed in a second cylinder. A crankshaft may be coupled with the first piston and the second piston for rotational motion associated with reciprocating movement of at least one of the first piston and the second piston. A combustion chamber may be fluidly coupled with the first cylinder and the second cylinder. An intake valve may provide selective fluid communication between an intake system and the combustion chamber. The intake valve may be generally centrally disposed relative to the first cylinder and the second cylinder. An exhaust valve may provide selective fluid communication between an exhaust system and the combustion chamber. An ignition source may be at least partially disposed within the combustion chamber.

19 Claims, 14 Drawing Sheets

(58) Field of Classification Search
CPC ...... F02B 2075/1808; F02B 2075/2275; F02B 2075/20; F02F 1/24; F02F 1/4235; F01L 1/18; F01L 1/181; F01L 1/053; F16C 3/06
See application file for complete search history.

(56) References Cited

U.S. PATENT DOCUMENTS

| | | | | |
|---|---|---|---|---|
| 2007/0204814 | A1* | 9/2007 | Scuderi | F01L 1/36<br>123/68 |
| 2009/0056331 | A1* | 3/2009 | Zhao | F02B 41/06<br>60/524 |
| 2014/0138491 | A1 | 5/2014 | Woo et al. | |
| 2015/0315959 | A1* | 11/2015 | Tour | F01P 3/02<br>123/70 R |
| 2018/0094577 | A1* | 4/2018 | Cocanougher | F02B 75/228 |
| 2020/0018194 | A1* | 1/2020 | Hittle | F01L 1/181 |
| 2022/0003159 | A1 | 1/2022 | Alexander et al. | |

* cited by examiner

10

10

100

MULTIPLE CYLINDER ENGINE

CROSS-REFERENCE TO RELATED APPLICATION

This application claims the benefit of U.S. provisional patent application Ser. No. 63/175,258, filed on 15 Apr. 2021, entitled "MULTIPLE CYLINDER ENGINE", the entire disclosure of which is incorporated herein by reference.

TECHNICAL FIELD

The present disclosure generally relates to internal combustion engines, and more particularly relates to multiple cylinder internal combustion engines.

BACKGROUND

Internal combustion engines are widely used for a variety of purposes. In many situations, internal combustion engines are used to power pieces of power equipment, particularly in situations where utilizing an electric motor would be inconvenient or impractical, such as when access to residential or commercial power supplies may be unavailable or when electrical power cords or extension cords would be cumbersome or dangerous. For example, often outdoor power equipment such lawnmowers, power washers, snow blowers, etc., utilize internal combustion engines as a power source. Frequently, in such applications the internal combustion engine may include a single cylinder, relatively small displacement engine. While such engines are typically cost effective and simple, many opportunities exist for improving the function, performance, and/or operation of such internal combustion engines.

SUMMARY

According to an implementation, an internal combustion engine may include a first piston reciprocatingly disposed in a first cylinder, and a second piston reciprocatingly disposed in a second cylinder. The internal combustion engine may also include a crankshaft coupled with the first piston and the second piston for rotational motion associated with reciprocating movement of at least one of the first piston and the second piston. A combustion chamber may be fluidly coupled with the first cylinder and with the second cylinder. An intake valve providing selective fluid communication between an intake system and the combustion chamber. The intake valve may be generally centrally disposed between first cylinder and the second cylinder. An ignition source may be at least partially disposed within the combustion chamber. The internal combustion engine may also include an exhaust valve providing selective fluid communication between an exhaust system and the combustion chamber.

One or more of the following features may be included. The crankshaft may be configured to be disposed in a generally vertical orientation during operation. The first cylinder and the second cylinder may be arranged in a parallel-inline configuration. The first cylinder and the second cylinder may be arranged in an offset configuration. The first cylinder and the second cylinder may have substantially the same diameter. The first cylinder and the second cylinder may have different diameters.

The crankshaft may be coupled with the first piston via a first crank journal and may be coupled with the second piston via a second crank journal. The crankshaft may be coupled with the first piston and the second piston via a first crank journal.

The combustion chamber may include a cavity overlying at least a portion of the first cylinder and at least a portion of the second cylinder. One or more of the intake valve and the exhaust valve may include overhead valves. The intake valve may be actuated by an intake rocker arm. The exhaust valve may be actuated by an exhaust rocker arm. The intake rocker arm may have a greater length than the exhaust rocker arm. A centerline of the intake valve may be at least partially offset from a bore center line of the first cylinder and the second cylinder. The exhaust valve may be at least partially offset over one of the first cylinder and the second cylinder. The ignition source may include a spark plug.

According to another implementation, an internal combustion engine may include a first piston reciprocatingly disposed in a first cylinder, and a second piston reciprocatingly disposed in a second cylinder. A crankshaft may be coupled with the first piston and the second piston for rotational motion associated with reciprocating movement of at least one of the first piston and the second piston. The crankshaft may be configured to be disposed in a generally vertical orientation during operation. A combustion chamber may be fluidly coupled with the first cylinder and the second cylinder. An intake valve may provide selective fluid communication between an intake system and the combustion chamber. The intake valve may be generally centrally disposed within the combustion chamber relative to the first cylinder and the second cylinder. An exhaust valve may provide selective fluid communication between an exhaust system and the combustion chamber. An ignition source may be at least partially disposed within the combustion chamber.

One or more of the following features may be included. At least a portion of a flow pathway associated with the intake valve may be disposed on a first side of an engine cylinder head. At least a portion of a flow pathway associated with the exhaust valve may be disposed on a second side of the engine cylinder head. The intake valve may be actuated by an intake rocker arm and the exhaust valve is actuated by an exhaust rocker arm. The intake rocker arm may have a greater length than the exhaust rocker arm. The intake valve and the exhaust valve may be actuated by a respective intake cam lobe and an exhaust cam lobe of a common camshaft.

According to yet another implementation, an internal combustion engine may include a first piston reciprocatingly disposed in a first cylinder, and may include a second piston reciprocatingly disposed in a second cylinder. A crankshaft may be coupled with the first piston and the second piston for rotational motion associated with reciprocating movement of at least one of the first piston and the second piston. The crankshaft may be configured to be disposed in a generally vertical orientation during operation. A combustion chamber may be fluidly coupled with the first cylinder and the second cylinder. An intake valve may provide selective fluid communication between an intake system and the combustion chamber. The intake valve may be generally centrally disposed relative to the first cylinder and the second cylinder. The intake valve may be at least partially offset relative to a bore centerline of the first cylinder and the second cylinder. An exhaust valve may provide selective fluid communication between an exhaust system and the combustion chamber. An ignition source may be at least partially disposed within the combustion chamber.

One or more of the following features may be included. The combustion chamber may be formed in an engine cylinder head. The engine cylinder head may define an intake pathway associated with the intake valve on a first side of the cylinder head. The engine cylinder head may define an exhaust pathway associated with the exhaust valve on a second side of the cylinder head.

DESCRIPTION OF EXAMPLE EMBODIMENTS

Figure 1:
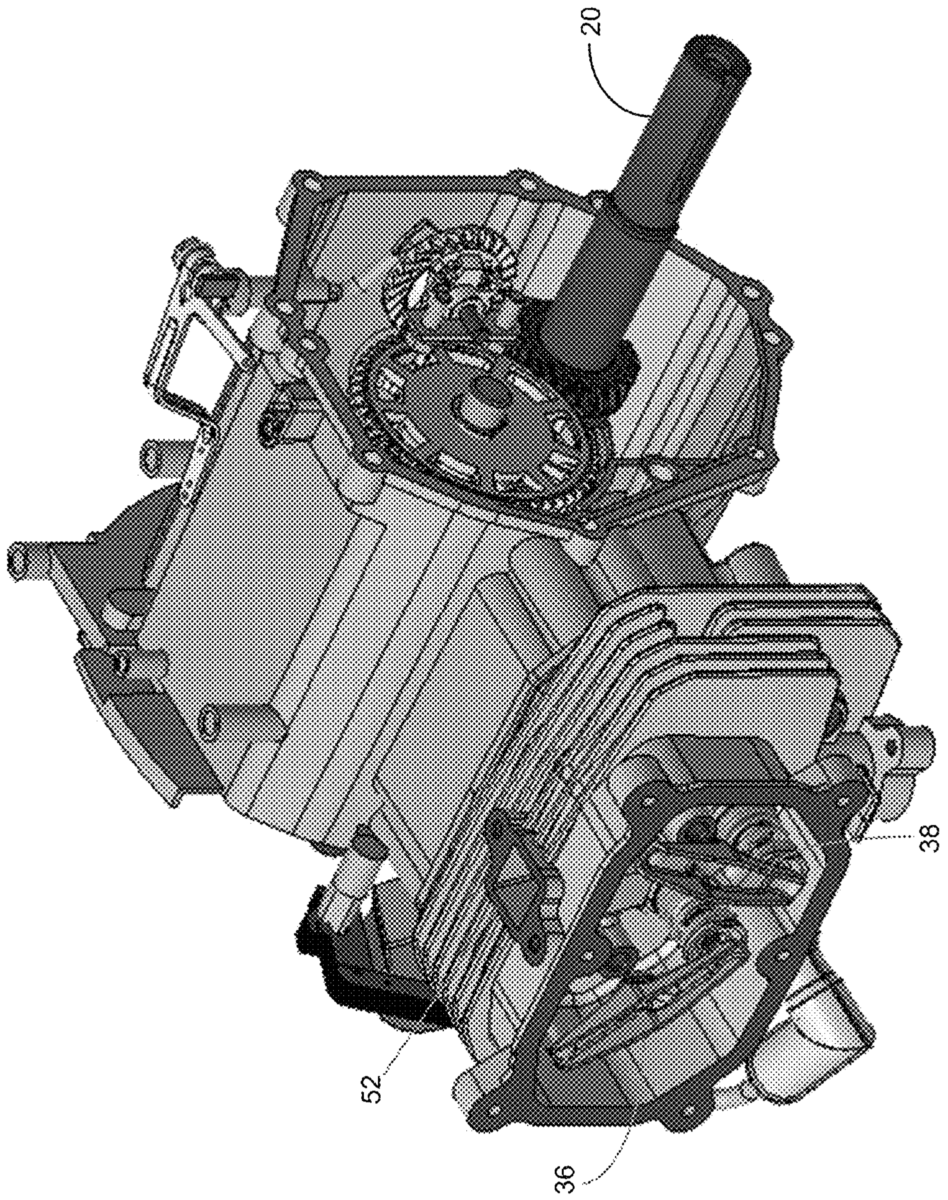
FIG. 1 depicts an illustrative example embodiment of a multiple cylinder internal combustion engine including a centrally positioned intake valve, having the cylinder head valve cover removed, according to an example implementation.

In general, the present disclosure relates to internal combustion engines having multiple cylinders. For the clarity of description and illustration, the present disclosure will generally relate to internal combustion engines including two cylinders. However, it will be appreciated that internal combustion engines consistent with the present disclosure may include a greater number of cylinders. As such, the present disclosure should not be limited to internal combustion engines having only two cylinders. Consistent with the present disclosure, the internal combustion engine may include a four-cycle engine, such as a gasoline engine or a propane engine. In additional implementations, the engine may include a diesel engine or a two-stroke engine. In some embodiments, the engine may include an air cooled engine, e.g., in which at least a portion of the cooling of the engine is accomplished by radiant cooling and/or convective cooling of at least a portion of the engine. For example, the at least a portion of the engine, such as the engine block (which may contain and/or define one or more of the cylinders) and/or the cylinder head (e.g., which may contain and/or define at least a portion of a combustion chamber associated with one or more of the cylinders) may include fins, or other features, that may facilitate radiative cooling and/or convective cooling (e.g., as a result of air movement across the features) of the engine. In some implementations, at least a portion of the cooling may be accomplished through the use of a liquid heat transfer medium, such as the lubricating oil of the engine, a water, glycol, etc., based coolant, or the like. Consistent with some such implementations, the liquid heat transfer medium may be splashed onto one or more pistons of the engine, may pass through (e.g., via liquid passages) at least a portion of the engine block and/or cylinder head, or the like. In some such implementations, the liquid may further pass through a heat transfer structure, such as a liquid-air heat exchanger (such as a radiator) and/or may pass through a reservoir (such as a crankcase) which may have fins and/or other heat dissipating structures.

According to some implementations, an internal combustion engine consistent with the present disclosure may include multiple cylinders (each having a corresponding reciprocating piston) that may, at least in part, participate in the four cycle combustion process. That is, two or more cylinders may participate in one or more of an intake of a fuel-air mixture, the compression of the fuel-air mixture, the combustion of the fuel-air mixture, power generation from the combustion of the fuel-air mixture, and at least partial exhaust of combustion products of the fuel-air mixture from at least a portion of the cylinders and/or at least a portion of the combustion chamber associated with the cylinders. For example, at least two cylinders may be at least partially filled with the fuel-air mixture, and the corresponding pistons of the at least two cylinders may be caused to reciprocate within the respective cylinders, at least in part, by the combustion of the fuel-air mixture. In some implementations consistent with the present disclosure, cylinders that may, at least in part, participate in the combustion process may also be referred to as fired cylinders.

Continuing with the foregoing, consistent with some implementations, each fired cylinder may “participate” in the combustions process in that the fired cylinder may be exposed to the burning fuel-air mixture. In some implementations, each fired cylinder may participate in the combustion process in that the fired cylinder may generate power and/or rotational motion as a result of being exposed to the burning fuel-air mixture. Consistent with some implementations, each fired cylinder may participate/undergo at least one or more cycles of the four-cycle process (i.e., intake, compression, power, exhaust). Further, consistent with some implementations, the at least two cylinders may be in fluid communication with each other during at least a majority of the intake cycle, the power cycle, and/or the exhaust cycle.

In some implementations, two (or more than two, in some particular implementations) fired cylinders may be in fluid communication with one another during at least a portion of the four-cycle process (and during a diesel and/or two-cycle process). In some particular implementations, the two (or more) fired cylinders may be in fluid communication with each other during more than one cycle of operation. For example, two fired cylinders may be in fluid communication with one another during the intake cycle, during the compression cycle, during the power cycle, during the exhaust cycle, and/or during more than one such cycle (including, but not limited to being in fluid communication with one another during all four cycles of operation). In some implementations, e.g., in which the internal combustion engine may include more than two fired cylinders, two fired cylinders may be in fluid communication with each other during at least a portion of the four-cycle process, and or more than two fired cylinders may be in fluid communication with each other during at least a portion of the four-cycle process. In some particular implementations, two (or more) fired cylinders may be in fluid communication with each other, at least in part, via a shared and/or common combustion chamber. For example, each of the fluidly coupled fired cylinders may be fluidly coupled with a combustion chamber, in which at least a portion of the combustion process may occur. In some implementations, two (or more) fired cylinders may be in fluid communication with each other via a shared and/or common combustion chamber during each of the four cycles of operation.

According an illustrative example embodiment consistent with the present disclosure, an internal combustion engine may generally include a first piston reciprocatingly disposed in a first cylinder, and may include a second piston reciprocatingly disposed in a second cylinder. A crankshaft may be coupled with the first piston and with the second piston for rotational motion of the crankshaft associated with reciprocating movement of the first piston and the second piston. That is, for example, rotation of the crankshaft may cause reciprocating movement of the first piston and the second piston. Similarly, reciprocating movement of the first piston and/or the second piston may cause rotation of the crankshaft. The internal combustion engine may further include a combustion chamber that may be fluidly coupled with the first cylinder and the second cylinder. Consistent with such a feature, the combustion chamber, together with the first cylinder and the second cylinder, may define a fluid volume (e.g., which may vary depending upon reciprocating movement and/or position of the first piston and the second piston within the respective first cylinder and second cylinder). In some such embodiments, the combustion chamber may be disposed at a distal end (e.g., relative to the crankshaft) of the first cylinder and the second cylinder, and may, at least in part, enclose the distal ends of the first cylinder and the second cylinder.

The internal combustion engine may further include an ignition source, which may selectively ignite a fuel-air mixture within one, or more, of the first cylinder, the second cylinder, and the combustion chamber. In some example embodiments, the ignition source may be at least partially disposed within the combustion chamber. The internal combustion engine may also include one or more intake valves. The one or more intake valves may provide selective fluid communication between an intake system and the combustion chamber. For example, the one or more intake valves may be selectively opened (e.g., during at least the intake cycle, and/or at least a portion of the intake cycle, of the four cycle internal combustion engine) to allow a fuel-air mixture to be drawn into one or more of the first cylinder, the second cylinder, and the combustion chamber by way of an intake runner or manifold, e.g., which may be coupled with a carburetor or fuel injection system (e.g., to facilitate mixing of fuel with air prior to, or during the fuel-air mixture entering via the intake valve). The intake valve may also be selectively closed to prevent flow from one or more of the first cylinder, the second cylinder, and the combustion chamber back into the intake system (e.g., during at least a portion of one or more of the compression cycle, the power cycle, and the exhaust cycle of the internal combustion engine).

Consistent with some embodiments, an intake valve (e.g., at least one of the one or more intake valves) may be generally centrally located within the combustion chamber (e.g., generally centrally located within the combustion chamber relative to the first and second cylinders). In some such implementations, the intake valve may generally be in between the first and second cylinders. In some implementations, the intake valve may be relatively evenly, centrally located relative to the first cylinder and the second cylinder. In some implementations, the intake valve may be offset relative to one or both of the first cylinder and the second cylinder. The internal combustion engine may also include one or more exhaust valves that may provide selective fluid communication between an exhaust system and one or more of the combustion chamber, the first cylinder, and the second cylinder. That is, the one or more exhaust valves may be selectively opened to allow combusted fuel-air mixture to be expelled from the combustion chamber and/or the first cylinder and the second cylinder (e.g., during at least a portion of the exhaust cycle of the internal combustion engine) into the exhaust system. The exhaust system may include, for example, an exhaust runner and/or exhaust manifold, e.g., which may be coupled with a muffler and/or other desired exhaust system components. In a similar manner as the intake valve(s) the exhaust valve(s) may be selectively closed, e.g., to prevent flow from one or more of the first cylinder, the second cylinder, and the combustion chamber into the exhaust system (e.g., during at least a portion of one or more of the intake cycle, the compression cycle, and the poser cycle of the internal combustion engine).

Consistent with some illustrative example embodiments, in an internal combustion engine including two cylinders fluidly coupled with a common combustion chamber, the intake valve(s) and exhaust valve(s) may be arranged to provide relatively efficient and effective mixing of the fuel and air forming the fuel-air mixture. Further in some such implementations, the arrangement of the intake valve(s) and/or exhaust valve(s) may allow relatively efficient and effective distribution of the fuel-air mixture within the volume of the combustion chamber and between the two cylinders (e.g., during at least a portion of the intake stroke and/or the compression stroke), and expulsion and/or removal of combusted fuel-air mixture from the volume of the combustion chamber and the two cylinders. For example, in some such embodiments, the arrangement of the intake valve(s) and/or exhaust valve(s) may allow and/or facilitate relatively uniform mixing of the fuel and air and relatively uniform distribution of the fuel-air mixture in the combustion chamber and/or the first and second cylinders during ignition and/or combustion of the fuel-air mixture. In some such implementations, the relatively efficient and effective mixing of the fuel and air and/or the relatively uniform distribution of the fuel-air mixture may beneficially impact one or more of relatively uniform power production between the two cylinders (e.g., the force acting on the respective first and second pistons), relatively complete and/or efficient combustion of the fuel-air mixture, overall power generation of the engine, thermal efficiency of the engine, and/or various additional and/or alternative operating parameters and/or characteristics of the engine.

Consistent with the foregoing, in some illustrative example embodiments the engine may include an intake valve (e.g., one or more intake valves) that may be generally centrally located between the first and second cylinders. In some such implementations, the generally centrally located intake valve may increase tumble, swirl, and roll of the fuel-air mixture entering the combustion chamber, e.g., which may increase and/or enhance the mixing of the fuel and air. In some such implementations, the increase in tumble, swirl and roll of the fuel-air mixture entering the combustion chamber may increase and/or enhance the mixing of fuel and air to provide a more uniform distribution of fuel-air mixture at stoichiometric ratios (and/or at other desired fuel to air ratios) within the combustion chamber. The increased and/or enhanced mixing of the fuel and air may, for example, provide relatively more uniform mixing of the fuel and the air (e.g., such that the fuel-air ratio may be relatively more uniform throughout one or more of the combustion chamber, the first cylinder, and the second cylinder), and/or may provide improved atomization and/or vaporization of the fuel (e.g., which may facilitate uniform and/or complete combustion of the fuel-air mixture). In some such embodiments, the intake valve may be generally centrally positioned between the two cylinders and an exhaust valve may be generally biased over one of the cylinders and/or to one side of the combustion chamber. In some such implementations, the surface area of the combustion chamber to volume of the combustion chamber may be relatively decreased by the generally centrally positioned intake valve. The relatively decreased combustion chamber surface area to volume may, in some implementations, increase the power output of the engine and/or provide more complete and/or efficient combustion, e.g., relative to a configuration having a relatively larger combustion chamber surface area to volume.

Consistent with the foregoing, and referring to the drawings, an illustrative example embodiment of an internal combustion engine 10 consistent with the present disclosure is shown. Consistent with the illustrative example embodiment, and as shown, e.g., in FIG. 2, the internal combustion engine 10 may include two cylinders (e.g., cylinders 12, 14), each having a respective piston (e.g., pistons 16, 18, readily visible in FIG. 3). The pistons 16, 18 may be reciprocatingly disposed within the respective cylinders 12, 14. Consistent with the illustrative example embodiment, the two cylinders may be arranged in a parallel, inline configuration. For example, the longitudinal axis of the two cylinders may lie in common plane with the rotational axis of the crankshaft 20. Further, consistent with the illustrated example embodiment, the first and second pistons may be similarly timed, such that each piston may reach a top-dead-center at the same, and/or generally similar, rotational position of the crankshaft. Referring also to FIG. 3, as shown in the illustrated example embodiment, the first and second pistons may be coupled with the crankshaft via respective connecting rods (e.g., connecting rods 22, 24). In some such embodiments, the respective connecting rods may be coupled with the crankshaft via respective crankpins, which may be generally coaxial with one another. In a similar illustrative example embodiment, the respective connecting rods of the two pistons may be coupled with the crankshaft via a single common crankpin. In some implementations, as shown, e.g., in FIG. 3, the crankshaft may include one or more counterweights, such as a counterweight disposed outside of the connecting rods (e.g., counterweights 26, 28), as well as a counterweight disposed between the connecting rods (e.g., counterweight 30). Further, in one particular implementation, the internal combustion engine may be configured having a vertical crankshaft (e.g., the internal combustion engine may be configured such that the crankshaft may have a generally vertical orientation in an intended operating condition, although operation in orientations deviating from vertical may still be possible).

While the above-described and depicted illustrated example embodiment is shown having a parallel, inline configuration, it will be appreciated that other configurations may also be utilized. For example, the first and second cylinders may be arranged such that the rotational axis of the crankshaft lies outside of the plane of the longitudinal centerlines of the first and second cylinders. Additionally and/or alternatively, the first and second pistons may have different timings, such that the first and second pistons may reach top-dead-center at relatively different rotational positions of the crankshaft. For example, the respective connecting rods associated with the first piston and the second piston may be coupled with the crankshaft via separate crankpins, e.g., which may not be coaxial with one another. Further, a greater or fewer number of counterweights may be utilized to achieve a desired rotational balancing of the crankshaft during operation of the internal combustion engine. Additionally, the internal combustion engine may be configured for operation in non-vertical orientations of the crankshaft, including, but not limited to, horizontal orientations of the crankshaft.

Figure 4:
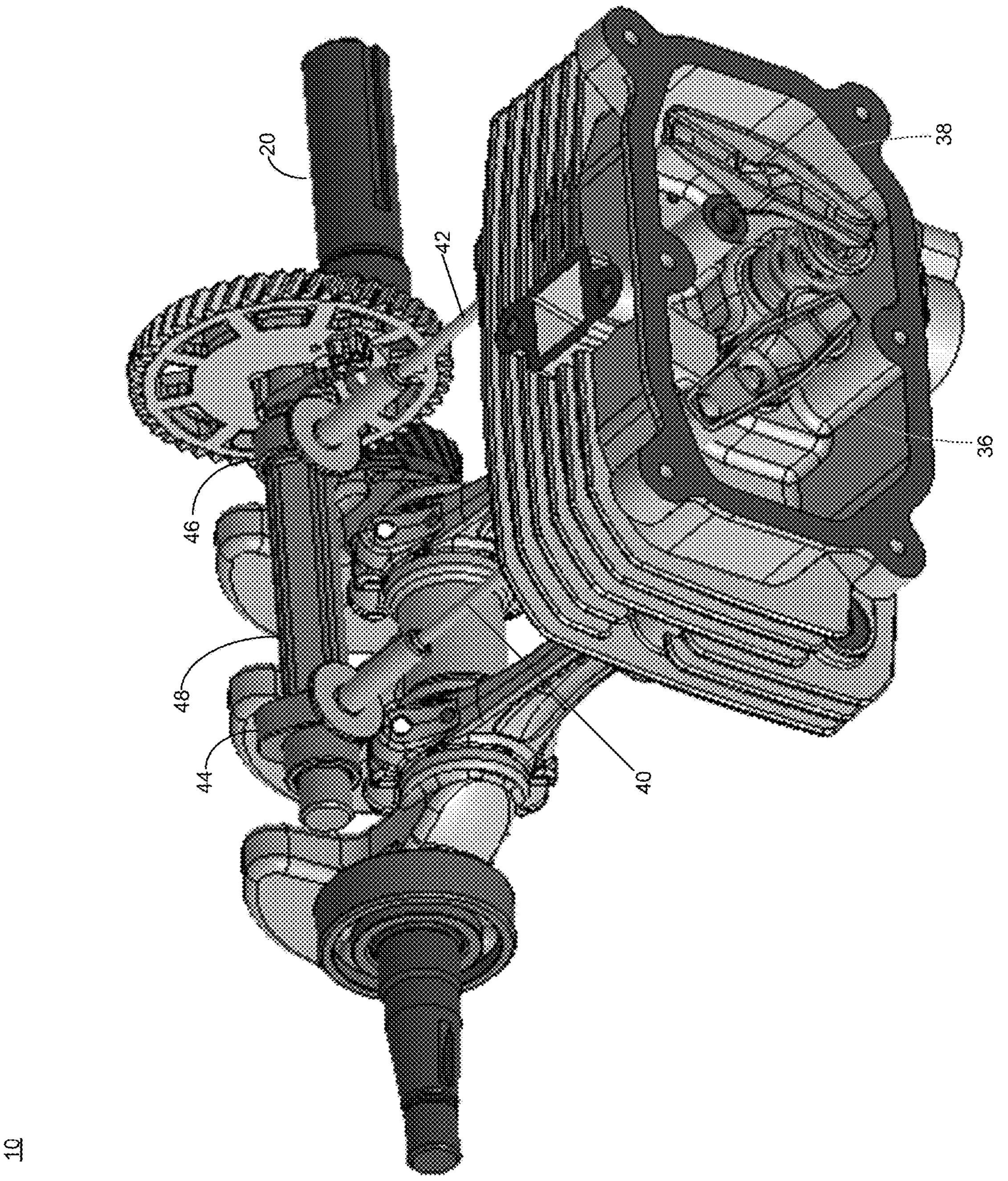
FIG. 4 depicts an illustrative example embodiment of a multiple cylinder internal combustion engine with the engine crankcase, engine block, and cylinder head valve cover removed, according to an example implementation.

With additional reference to FIG. 4, consistent with some embodiments, the internal combustion engine 10 may be generally configured having pushrod-actuated overhead valves. That is, the intake valve(s) (e.g., intake valve 32) and/or exhaust valve(s) (e.g., exhaust valve 34) may be actuated by respective rocker arms (e.g., intake rocker arm 36 and exhaust rocker arm 38. The respective rocker arms may be actuated by respective pushrods (e.g., intake pushrod 40 and exhaust pushrod 42), and the respective pushrods may be actuated by respective cam features, or cam lobes (e.g., intake cam lobe 44 and exhaust cam lobe 46). Consistent with the illustrated example embodiment, the internal combustion engine 10 may include a single camshaft (e.g., camshaft 48), which may include each of the intake cam lobe 44 and the exhaust cam lobe 46 coupled for rotation with the camshaft 48. Further, consistent with the illustrated example embodiment, the camshaft may be rotationally coupled with the crankshaft, e.g., via respective crankshaft gear and camshaft gear. As is known, the crankshaft may be rotationally coupled with the camshaft in a 2:1 ratio (e.g., two rotations of the crankshaft result in one rotation of the camshaft) to provide appropriate valve timing corresponding with four cycle operation of the internal combustion engine. While not specifically discussed, it will be appreciated that various additional features may be includes, such as, but not limited to, various valve springs, valve retainers, rocker pivots, etc. Further, in some implementations, a compression release mechanism may be utilized in connection with the exhaust valve and/or the intake valve. As is known, a compression release mechanism may at least partially open the exhaust valve (and/or the intake valve) during at least a portion of the rotation of the camshaft during starting of the internal combustion engine. At least partially opening the exhaust valve (and/or the intake valve) during at least a portion of the rotation of the camshaft (and thereby also during at least a portion of the crankshaft) may release compression pressure from the cylinders during reciprocation of the piston during starting. As such, the resistance to rotation of the crankshaft may be deceased during starting of the engine, which may result in less torque being required to start the internal combustion engine. Such a configuration may facilitate starting via a recoil starting arrangement and/or allow a relatively smaller motor and/or relatively lower power consumption to be realized with an electric starting system.

While the illustrated example embodiment includes a gear-driven camshaft, it will be appreciated that the camshaft may be rotationally coupled with the crankshaft in a variety of suitable configurations, including, but not limited to, belt-drive, chain-drive, etc. Additionally, while the illustrated example embodiment includes a pushrod actuated valve arrangement, with the camshaft being disposed within the crankcase, other configurations may equally be utilized. For example, the camshaft may be disposed outside of the crankcase, such as in the cylinder head. Further, rather than a pushrod actuation arrangement, the camshaft may directly actuate the rockers (e.g., the respective cam lobes may directly actuate the rockers, such as in a roller rocker configuration). Still further, in some implementation, the cam may directly actuate the valves (e.g., the cam lobes may directly actuate the valve stems). It will be appreciated that various additional and/or alternative configurations may equally be utilized.

Figure 2:
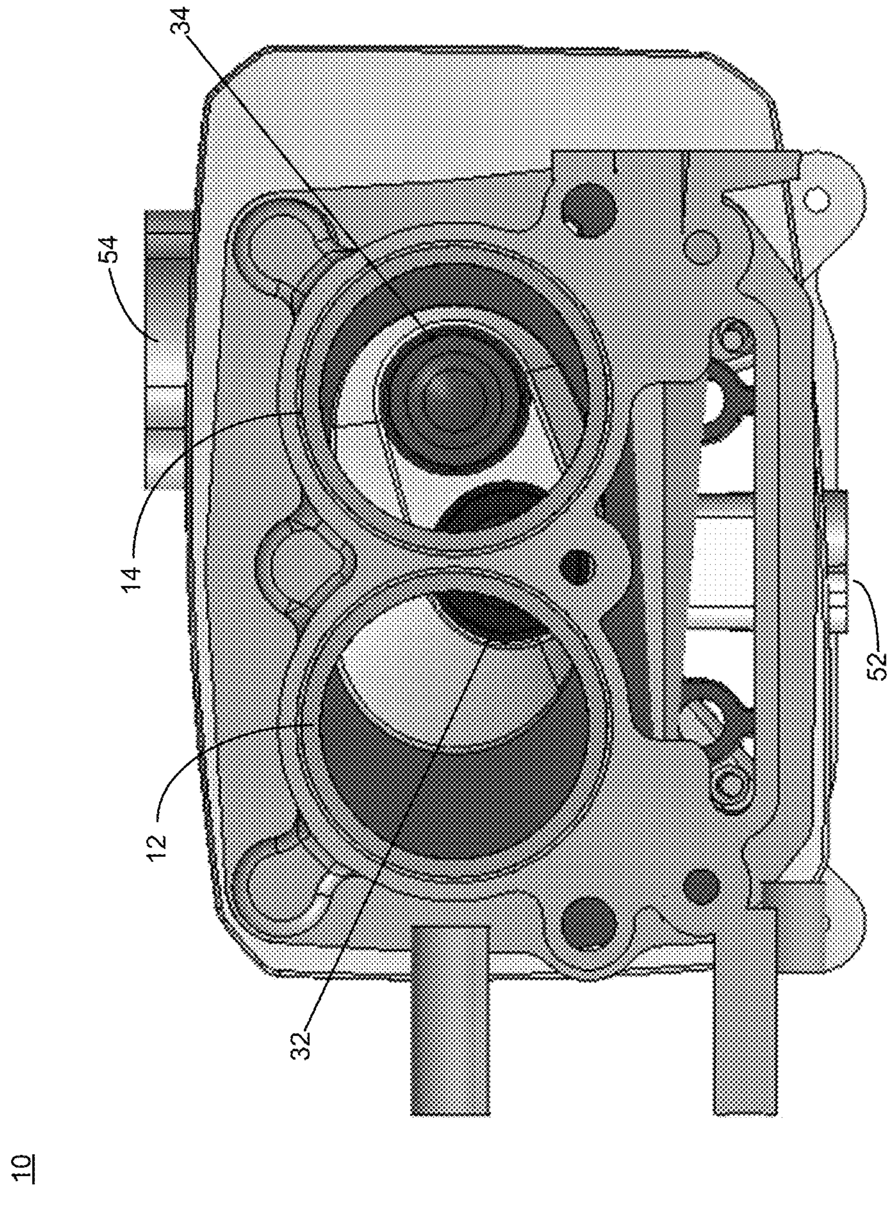
FIG. 2 is a bottom view of an illustrative example embodiment of a multiple cylinder internal combustion engine up through the cylinder bores into the combustion chamber, according to an example implementation.
Figure 3:
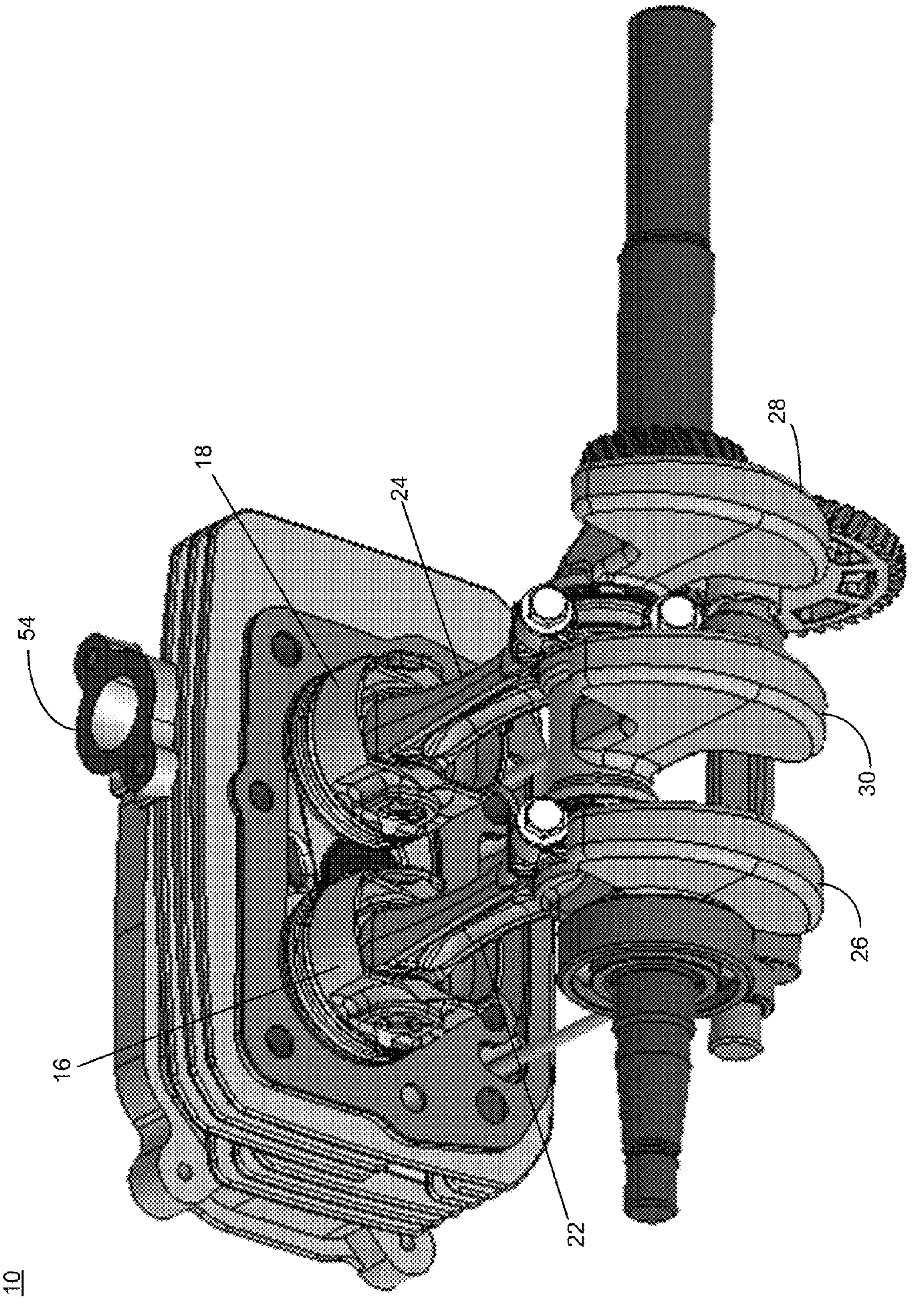
FIG. 3 depicts an illustrative example embodiment of a multiple cylinder internal combustion engine with the engine crankcase and engine block removed, according to an example implementation.

With particular reference to FIGS. 5 through 8, as generally described above, in some example embodiments consistent with the present disclosure, the intake valve(s) (e.g., intake valve 32) may be generally centrally disposed relative size and/or geometry of the combustion chamber (e.g., combustion chamber 50, generally), and/or may be generally centrally disposed relative to the first cylinder and the second cylinder (e.g., as is generally depicted, e.g., in FIG. 2). For example, consistent with the illustrated example embodiment, the combustion chamber 50 may generally overlie substantially all of the bore of the first cylinder and the bore of the second cylinder (e.g., the perimeter of the combustion chamber at the cylinder head/engine block interface may substantially overlie and/or extend around and/or outside of the bores of the first and second cylinders. In some implementations, the combustion chamber may overlie at least a portion of the engine block surrounding the bore of the first cylinder and/or the bore of the second cylinder (e.g., the combustion chamber, at the cylinder head/engine block interface may extend around and/or encompass the engine block around the first cylinder and the second cylinder. In some implementations, the combustion chamber may overlie less than the entirety of the first cylinder and/or the second cylinder (e.g., at least a portion of the first cylinder and/or the second cylinder may be covered by a portion of the cylinder head outside of the region of the combustion chamber. It will be appreciated that additional and/or alternative configurations may equally be implemented.

Figure 8:
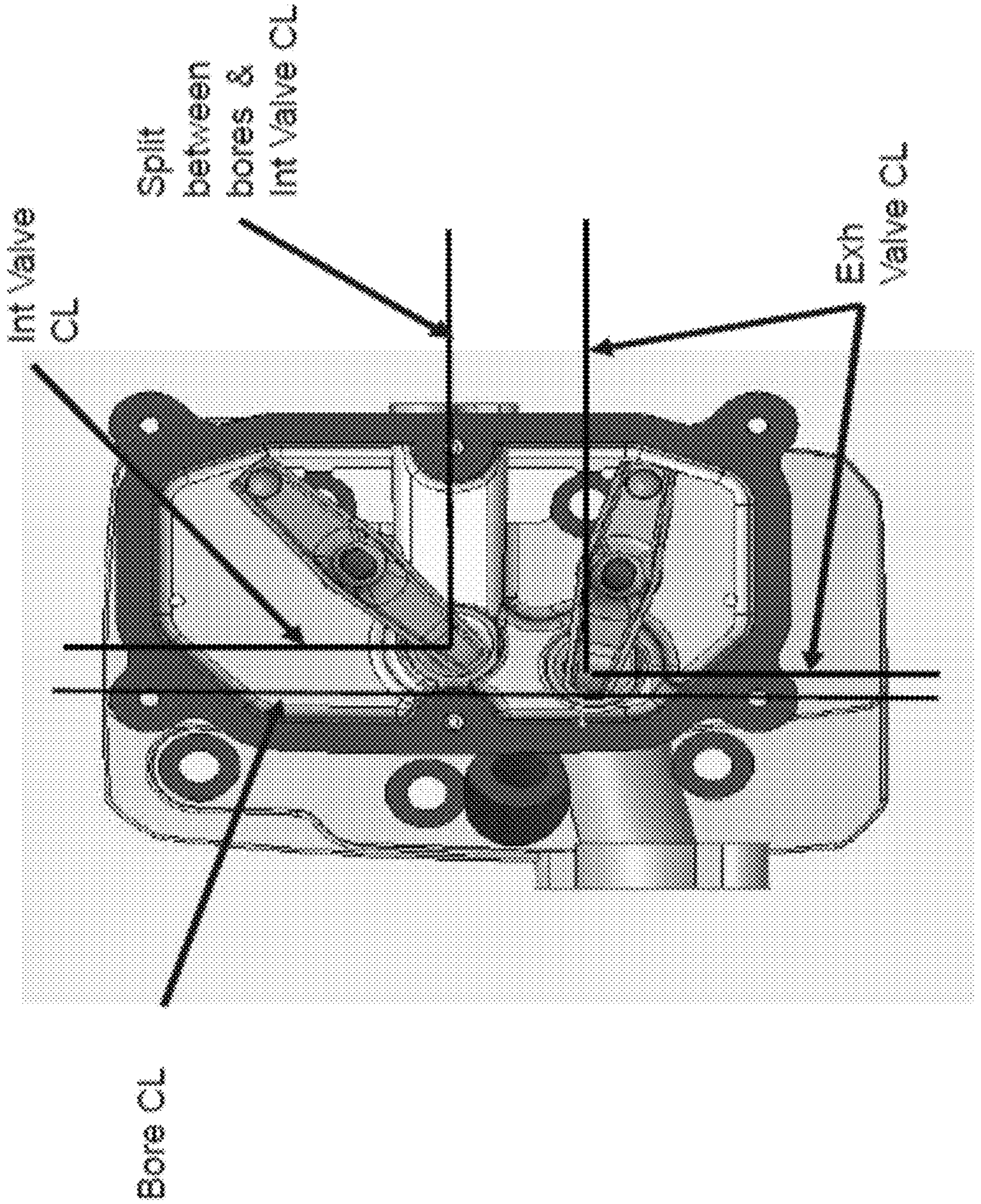
FIG. 8 is a plan view an illustrative example embodiment of a cylinder head for a multiple cylinder internal combustion engine with a centrally positioned intake valve, including the combustion chamber and cylinder head surface for mating with a corresponding engine block, according to an example implementation.

Consistent with the illustrated example embodiment shown in FIG. 8, in one particular embodiment the center of the intake valve may be located on the split between the bores (e.g., between the first cylinder and the second cylinder). For example, a line extending through the center of the circular bore of the first cylinder and the center of the circular bore of the second cylinder may define the bore centerline. The split between the first cylinder and the second cylinder may be a line perpendicular to the bore centerline that extends through the midpoint along the bore centerline between the center of the circular bore of the first cylinder and the center of the bore of the second cylinder. In one such particular example the center of the intake valve may be substantially equal distance between the center longitudinal axis of the first cylinder and the center longitudinal axis of the second cylinder. In the particular illustrated example embodiment shown in FIG. 8, the center of the intake valve may be on the split between the first cylinder and the second cylinder, and may be laterally displaced from the bore centerline. It will be appreciated that other configurations may be equally utilized. For example, the center of the intake valve may be displaced from the split between the bore (e.g., may be closer to the center of the first cylinder and/or may be closer to the center of the second cylinder). Additionally, while FIG. 8 depicts an implementation in which the center of the intake valve is laterally displaced from the bore centerline, in other implementations the center of the intake valve may be aligned with the bore centerline, and/or may be laterally displaced a greater distance or a lesser distance from the bore centerline. Further, in some example implementations, the center of the intake valve may be laterally displaced from the bore centerline in the opposite direction as depicted in FIG. 8.

Figure 7:
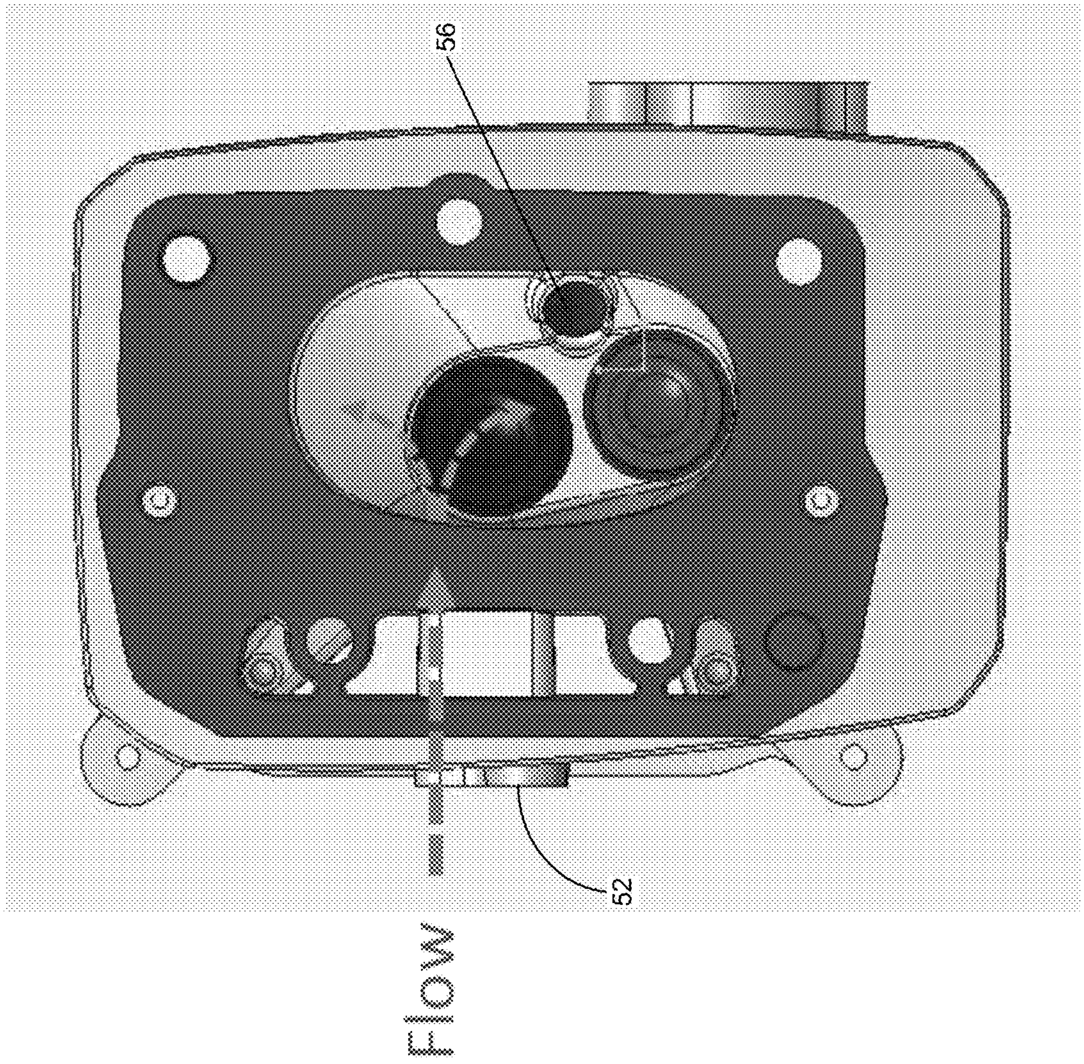
FIG. 7 is a plan view an illustrative example embodiment of a cylinder head for a multiple cylinder internal combustion engine with a centrally positioned intake valve, including the combustion chamber and cylinder head surface for mating with a corresponding engine block, according to an example implementation.

With particular reference to FIG. 7, in an illustrative example embodiment, the generally centrally positioned intake valve may facilitate flow of fuel-air mixture into the combustion chamber (and possibly into at least a portion of one or more of the first cylinder and the second cylinder). For example, consistent with the illustrative example embodiment, the intake valve may provide selective fluid communication between the combustion chamber 50 and an intake port 52 (e.g., via the intake passage, or runner, extending therebetween). The intake port 52 may provide a fluid passage for a fuel-air mixture from a carburetor, or the like. It will be appreciated that other configurations, such as fuel injection, may dispense (e.g., spray and/or atomized) fuel into the intake port itself, whereupon air flowing through the intake port into the combustion chamber, via the intake valve, may mix with the fuel from a fuel injector to provide the fuel-air mixture. In additional and/or alternative configurations, a fuel injector may dispense fuel into an intake passage upstream of the intake port.

Consistent with the illustrated example embodiment, with the intake valve being generally centrally located within the combustion chamber and/or generally centrally located relative to the first cylinder and the second cylinder, the exhaust valve (e.g., exhaust valve 34) may be displaced (e.g., in a direction parallel to the bore centerline) toward one of the first cylinder and the second cylinder. That is, for example, if the intake valve is generally centrally located, the exhaust valve may be off to the side of the intake valve. For example, in the illustrated example embodiment, the exhaust valve may, therefore, be more closely positioned relative to one cylinder or the other cylinder. Combustion products from burning of the fuel-air mixture may exit the combustion chamber via the exhaust valve and an exhaust port (e.g., exhaust port 54 in fluid communication with the exhaust valve via the exhaust passage, or runner, and then into an exhaust system which may, for example, include a muffler, etc.). Consistent with the illustrated example, the intake port may extend through a first side of the cylinder and the exhaust port may extend through a second, generally opposed, side of the cylinder head. Such a configuration may, for example, facilitate locating the intake system and the exhaust system on different and/or opposed sides of the cylinder head and/or engine. In some implementations, locating the intake system and the exhaust system (e.g., including the intake port and runner and the exhaust port and runner, respectively) may, for example, reduce heating of the intake fuel-air mixture due to proximity with heated combustion products being exhausted from the combustion chamber.

Figure 5:
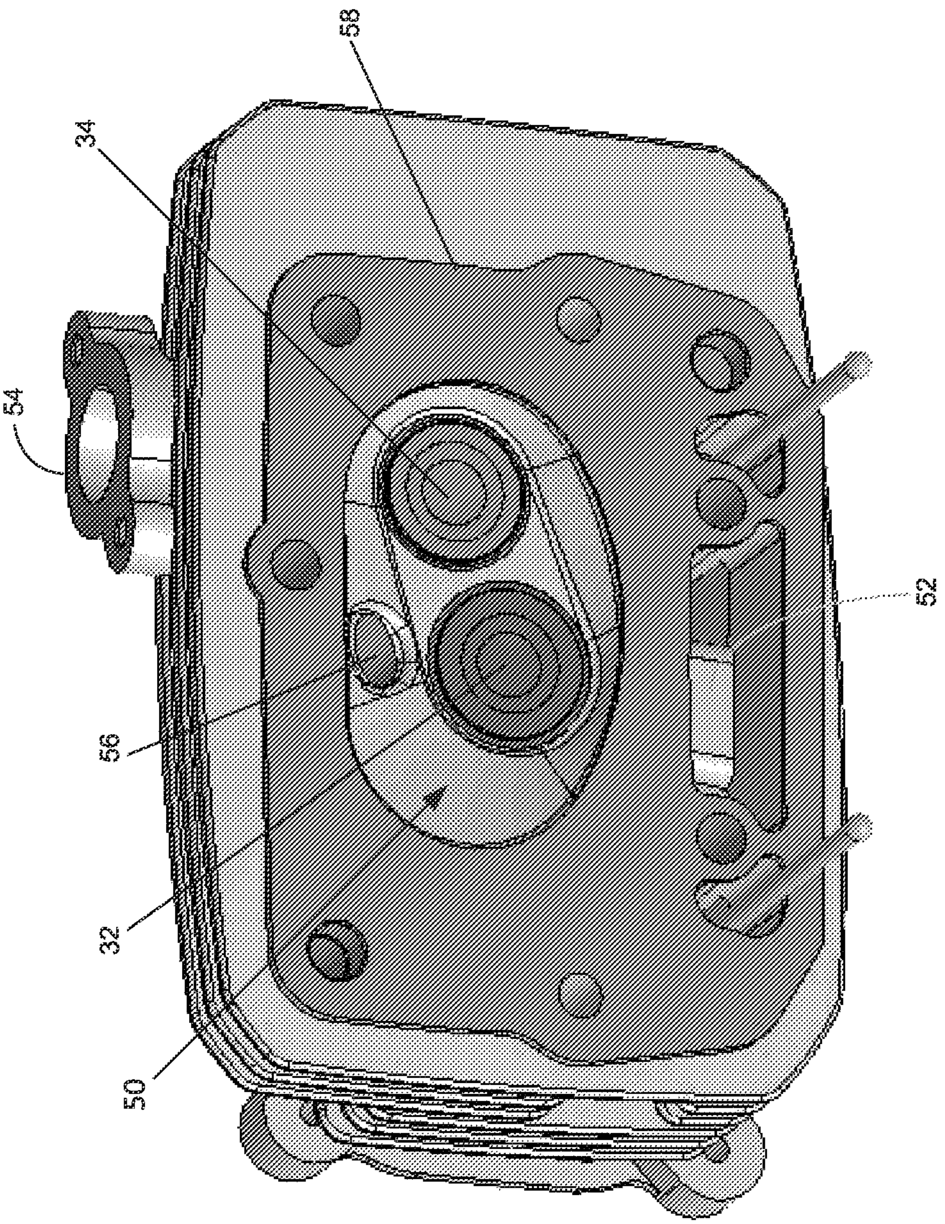
FIG. 5 depicts an illustrative example embodiment of a cylinder head for a multiple cylinder internal combustion engine with a centrally positioned intake valve, including the combustion chamber and cylinder head surface for mating with a corresponding engine block, according to an example implementation.
Figure 6:
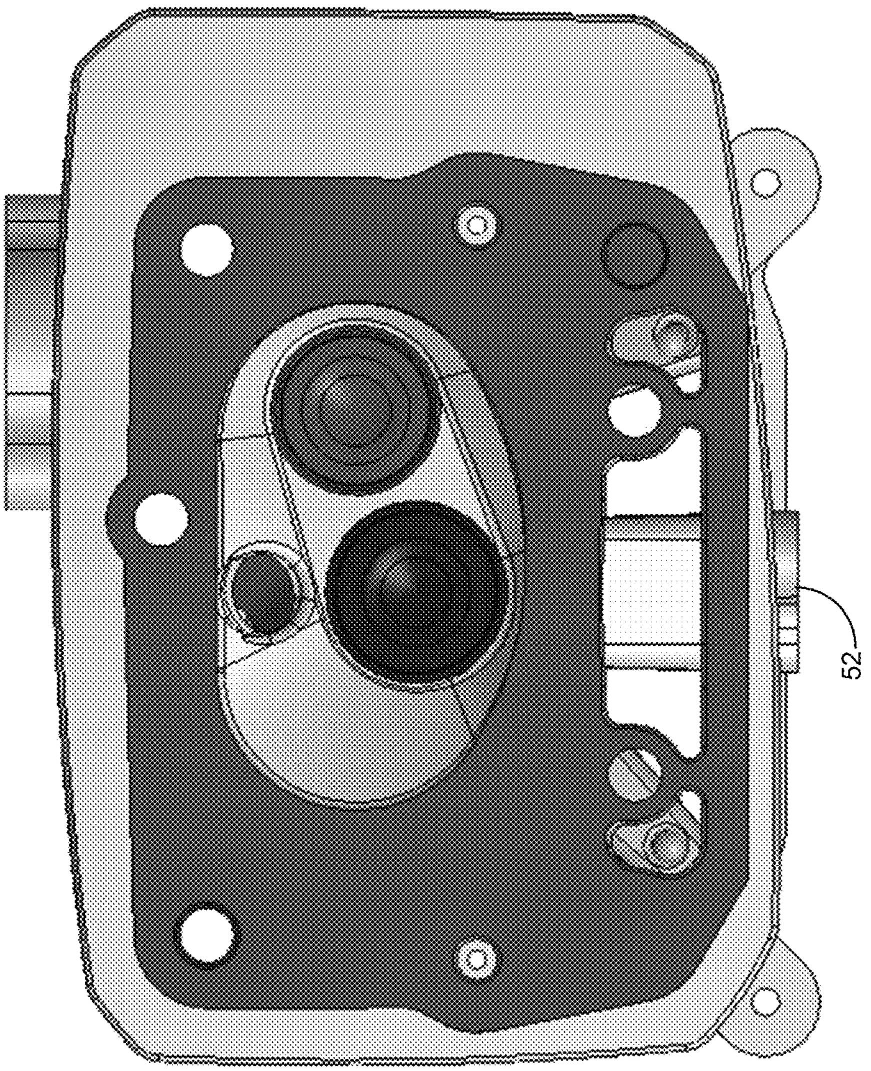
FIG. 6 depicts an illustrative example embodiment of a cylinder head for a multiple cylinder internal combustion engine with a centrally positioned intake valve, including the combustion chamber and cylinder head surface for mating with a corresponding engine block, according to an example implementation.

As additionally depicted, the combustion chamber may also include and/or locate an ignition source. For example, as shown, e.g., in FIG. 5, the combustion chamber may include a sparkplug port 56. As is generally known, a sparkplug may be received in the sparkplug port. During operation of the internal combustion engine, an engine ignition system may fire the spark plug in time coordination with the reciprocation of the pistons and opening and closing of the intake and exhaust valves to ignite the fuel-air mixture at a desired timing or stage in the four cycle operation. Consistent with various implementations, the sparkplug port (and, thereby, the sparkplug) may be generally centrally disposed relative to the combustion chamber and/or relative to the first cylinder and the second cylinder (e.g., as generally shown in FIG. 5, with the sparkplug port being generally proximate the split between the bores. In some implementations the sparkplug port may be generally positioned between the intake valve and the exhaust valve (e.g., as generally shown in FIG. 8). The cylinder head may further include a head gasket 58, e.g., which may generally define a mating surface between the cylinder head and the engine block of the internal combustion engine. It will be appreciated that other configurations may also be implemented. For example, the sparkplug port may be disposed on an opposite side of the intake valve relative to the exhaust valve). Other configurations may also be implemented.

Figure 9:
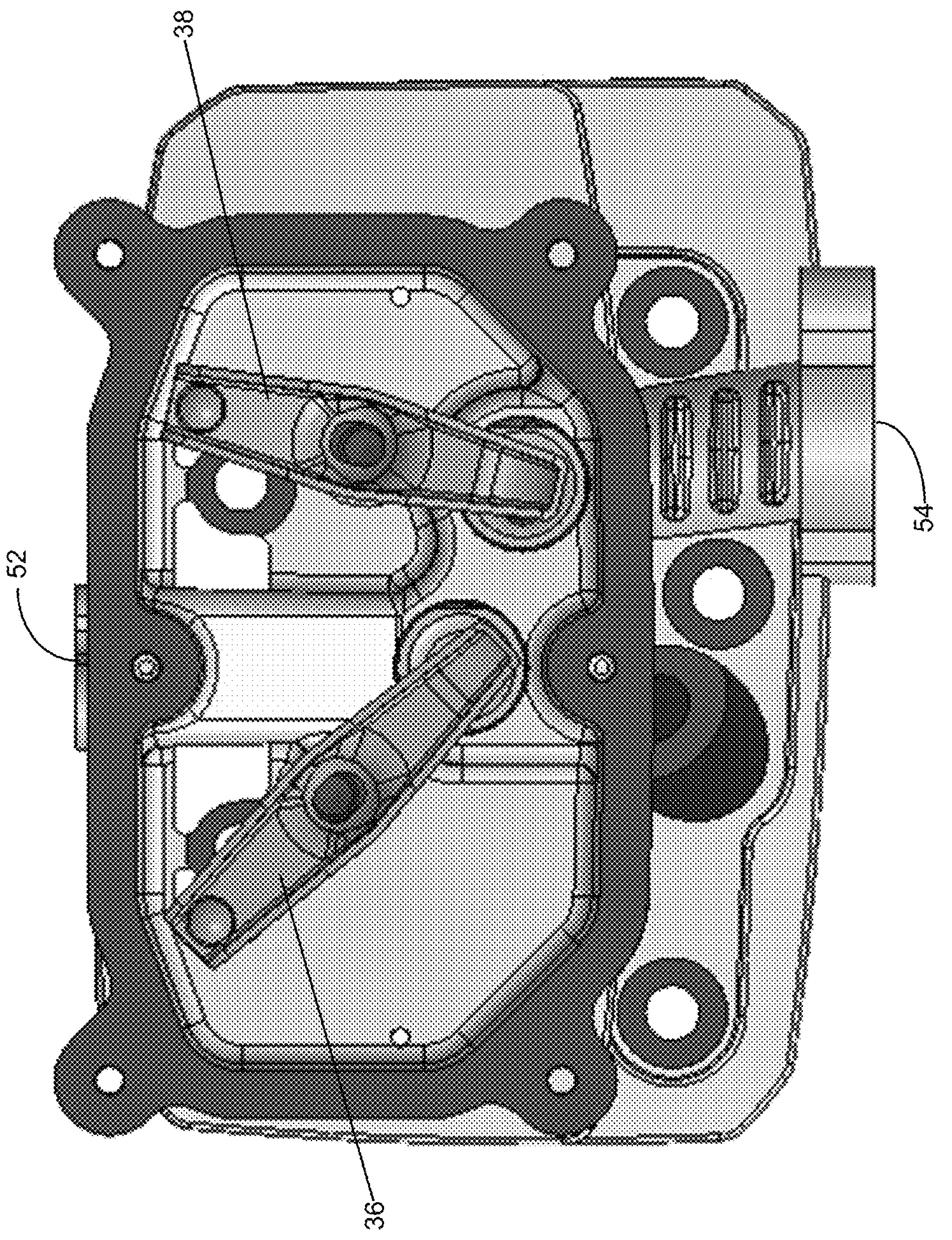
FIG. 9 is a plan view of a top of a cylinder head for a multiple cylinder internal combustion engine with a centrally positioned intake valve, with the cylinder head valve cover removed to show the rocker arms, according to an example implementation.
Figure 10:
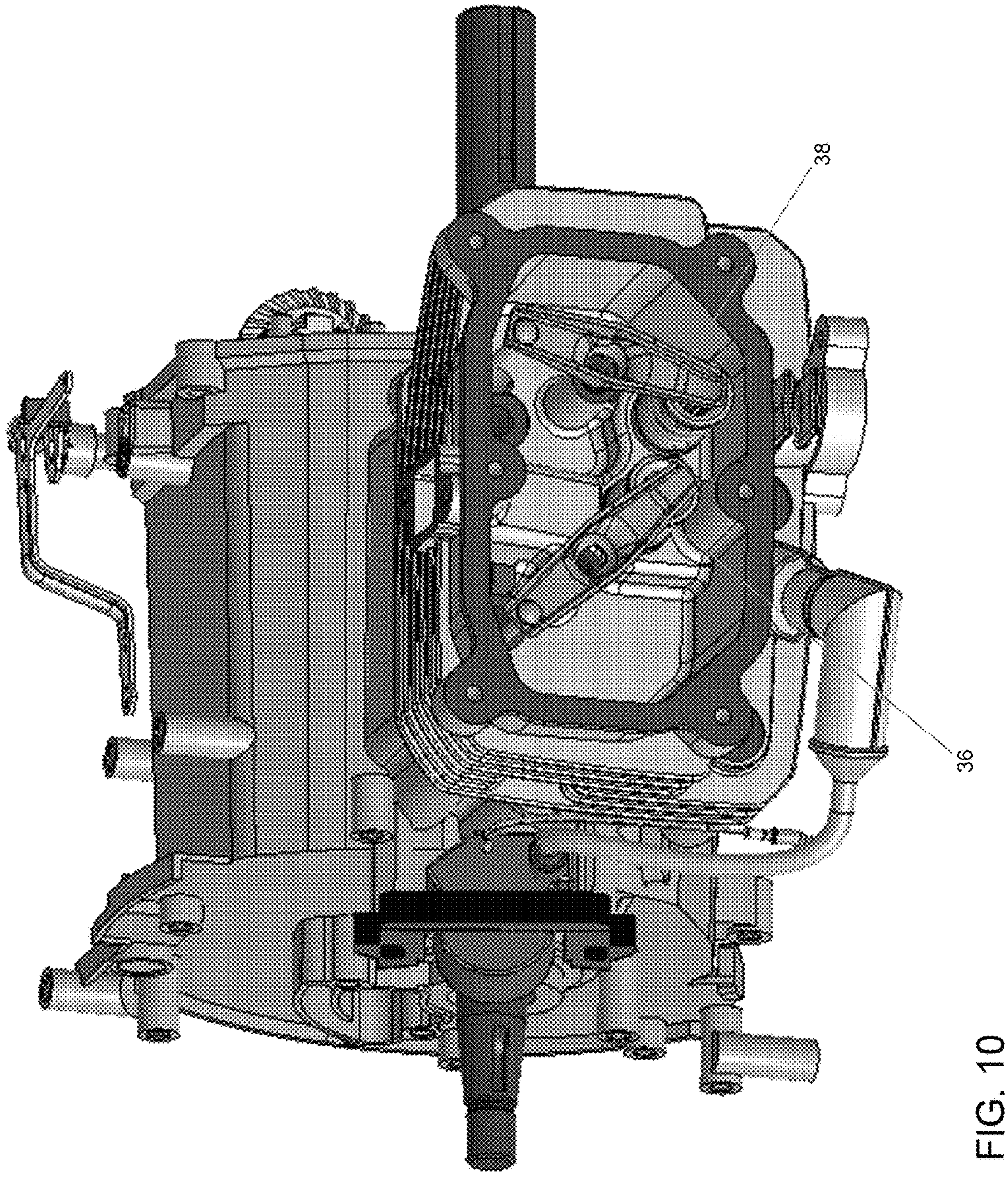
FIG. 10 depicts an illustrative example embodiment of a multiple cylinder internal combustion engine including a centrally positioned intake valve, having the cylinder head valve cover removed, according to an example implementation.

With additional reference to FIGS. 9-10, consistent with an implementation including pushrod actuated valves and a general centrally positioned intake valve, the internal combustion engine 10 may utilize different rocker arms for actuating the intake valve and for actuating the exhaust valve. For example, as generally shown, in some implementations the intake rocker arm 36 may be longer than the exhaust rocker arm 38. For example, consistent with an implementation in which the valves may be pushrod actuated by a camshaft that may be located in the engine crankcase, the respective intake and exhaust cam lobes may be disposed on the camshaft so as not to interfere with the rotating crankshaft (e.g., including the crankpins, counterweights, and/or connecting rods), to provide clearance between the pushrods and the cylinders (e.g., the pushrods may be disposed in galleys or passages that may be spaced from the cylinders), and the like. According to such an arrangement the distance between the axis of the intake pushrod and the center of the intake valve (e.g., which may include the valve stem that may be acted upon by the rocker arm) that is centrally positioned relative to the combustion chamber and/or the first and second cylinders may be greater than the distance between the axis of the exhaust pushrod and the center of the exhaust valve (e.g., which may include the valve stem that may be acted upon by the rocker arm), e.g., which may be offset over one of the cylinders. As such, the rocker arm associated with the intake valve may be longer that the rocker arm associated with the exhaust valve due to the extended reach between the intake pushrod and the intake valve as compared to the exhaust pushrod and the exhaust valve. According to such an implementations, when taking into account the positions of the cam lobes (e.g., which may, at least in part, be dictated by the architecture of the internal combustion engine) that may interact with the valves via the rocker arms and pushrods, the rocker arm for the intake valve(s) may longer than the rocker arm for the exhaust valve(s).

Figure 11:
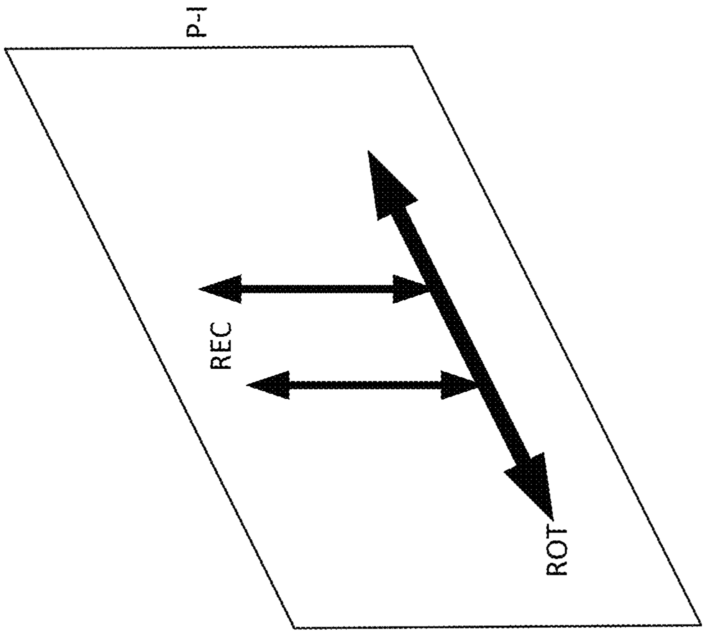
FIG. 11 diagrammatically depicts a parallel, inline engine configuration.

As generally discussed above, in some implementations, at least the first cylinder and the second cylinder may be generally arranged to provide a parallel, inline configuration. For example, as diagrammatically depicted in FIG. 11, the crankshaft may generally be oriented having a rotational axis ROT. Further the first and second pistons may have reciprocating axes REC, generally, which may, for example, be defined by the central axis of the first and second cylinders. As shown, in a parallel, inline configuration, the rotational axis ROT of the crankshaft and the reciprocating axes REC may generally lie in a common plane P-I. Accordingly, the cylinders may be generally parallel with each, arranged generally in-line with each other, and may lie in a common plane with the rotational axis of the crankshaft.

Figure 12:
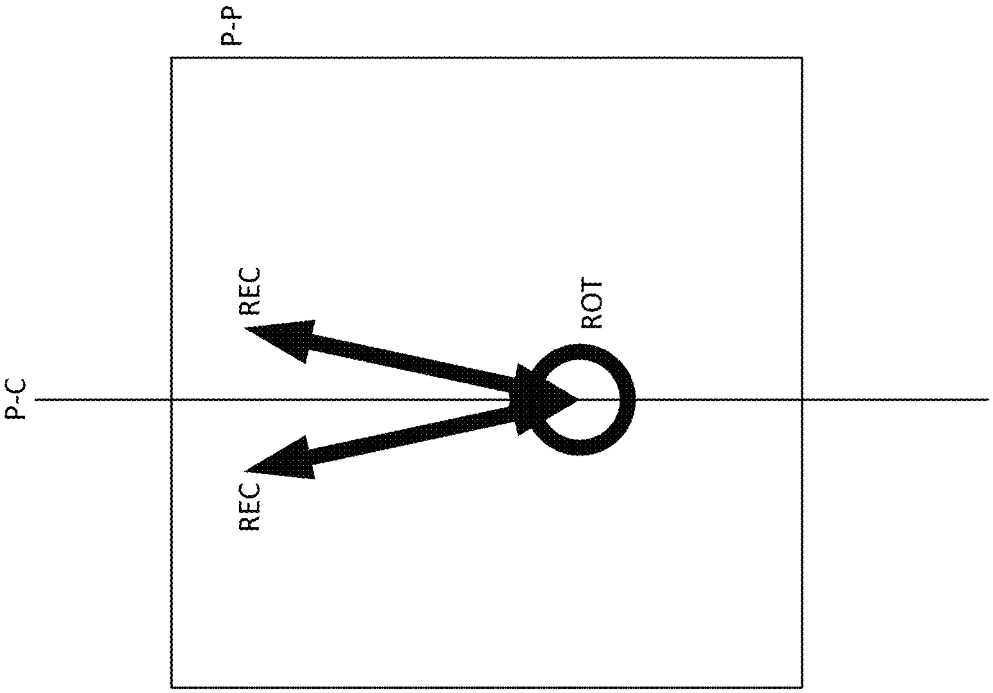
FIG. 12 diagrammatically depicts an offset engine configuration.

While a parallel, inline configuration may suitably be used in some embodiments consistent with the present disclosure, it will be appreciated that other configurations may also be utilized. For example, in some implementations consistent with the present disclosure, the first and second cylinders may be arranged such that the rotational axis of the crankshaft lies outside of the plane of the longitudinal centerlines of the first and second cylinders. For example, and referring also to FIG. 12, in some implementations, the plane of cylinders P-P, may include a plane in which the longitudinal axes of the first and second cylinders lie (e.g., which may at least generally correspond to the exes of reciprocation, REC, of the first and second pistons). In an embodiment in which the engine does not have a parallel, inline configuration, the rotational axis of the crankshaft, ROT, may lie in a plane P-C that may be different from the plane of the cylinders P-P. In some such configurations, the cylinders may have an offset, or V, configuration.

As generally described above, in some implementations, the first and second pistons may have a common timing, e.g., such that each piston may reach a top-dead-center (i.e., an apogee of reciprocation) at the same (and/or generally the same) rotational angle of the crankshaft. Additionally and/or alternatively, the first and second pistons may have different timings, such that the first and second pistons may reach top-dead-center at relatively different rotational positions of the crankshaft. For example, the respective connecting rods associated with the first piston and the second piston may be coupled with the crankshaft via separate crankpins, e.g., which may not be coaxial with one another. Further, a greater or fewer number of counterweights may be utilized to achieve a desired rotational balancing of the crankshaft during operation of the internal combustion engine. Additionally, the internal combustion engine may be configured for operation in non-vertical orientations of the crankshaft, including, but not limited to, horizontal orientations of the crankshaft.

As generally described above, the crankshaft may be coupled with the first piston and the second piston for rotation of the crankshaft associated with reciprocating movement of the first piston and/or the second piston. In particular, in some implementations, rotation of the crankshaft may result in reciprocating movement of the first piston and/or the second piston. Correspondingly, reciprocating movement of the first piston and/or the second piston may result in rotation of the crankshaft. As discussed above, during operation of an internal combustion engine consistent with the present disclosure, both modes of movement may be implicated during different operating cycles of the internal combustion engine (e.g., rotation of the crankshaft may drive reciprocating movement of one or more of the pistons, and an induced reciprocating movement of one or more of the pistons may drive rotation of the crankshaft). Consistent with the present disclosure, one, or both, of the pistons may be associated with the crankshaft for respective movement thereof in a variety of manners.

Consistent with an example embodiment, and as generally discussed above, the crankshaft may be coupled with the first piston via a first crank journal and may be coupled with the second piston via a second crank journal. It will be understood that crank journals may generally refer to portion of the crankshaft that is offset from the centerline of the crankshaft and is configured to be coupled with a connecting rod for rotation of the crankshaft associated with reciprocating movement of the piston connected with the connecting rod. Crank journals may also be referred to as crank pins. Example arrangements including a crankshaft coupled with a first piston via a first crank journal and coupled with a second piston via a second crank journal are depicted, e.g., in FIGS. 3 and 4, with respect to the illustrated example internal combustion engine 10. As shown, for example, in FIG. 3, the crankshaft 20 may generally include a first crank journal disposed between counterweights 26 and 28, and a second crank journal disposed between counterweights 28 and 30. The first piston 16 may be coupled with the crankshaft 20 via the first crank journal and the second piston 18 may be coupled with the crankshaft 20 via the second crank journal. Consistent with some such embodiments in which each of the first and second pistons are coupled to the crankshaft via respective first and second crank journals, and as generally described above, a crankshaft including two crank journals may also include a counterweight between at least the first crank journal and the second crank journal. For example, as shown in FIG., the crankshaft 20 may include three counterweights, 26, 28, and 30, in which counterweight 28 may be disposed between the first crank journal and the second crank journal.

In further example embodiments consistent with the present disclosure, the crankshaft may be coupled with the first piston and the second piston via a first crank journal. For example, the crankshaft may only include a single crank journal. Consistent with such an embodiment, the first piston and the second piston may both be coupled to the crankshaft via the first crank journal. Further, the crankshaft may include one counterweight on the outside of the connection to the first piston and a second counterweight on the outside of the connection to the second piston, without a counterweight being disposed between the connections to the two pistons. It will be appreciated that, in some such embodiments, the crankshaft includes only a single crank journal, or crank pin. However, in some implementations it may not be necessary to finish the entirety of the single crank journal to a bearing finish (such as a highly polished and/or exactingly high round tolerance). For example, the region associated with the connection to the first piston and the region associated with the connection to the second piston may be finished to a bearing finish, while the region of the crank journal in between these two connection points may be less well finished.

As generally discussed above, the first piston and the second piston may be arranged in a variety of configurations (such as parallel, in-line, and offset), and the first piston and the second piston may be coupled with the crankshaft in a variety of configurations (e.g., each of the pistons coupled to separate respective crank journals, and both of the pistons coupled to the same, single crank journal). Accordingly, it will be appreciate that a variety of connecting rod configurations may be utilized. As is generally known, a connecting rod may provide the physical connection between a piston and a crank journal of the crankshaft. With additional reference to FIGS. 13 through 17, a variety of example crankshaft and connecting rod configurations are shown.

Figure 14:
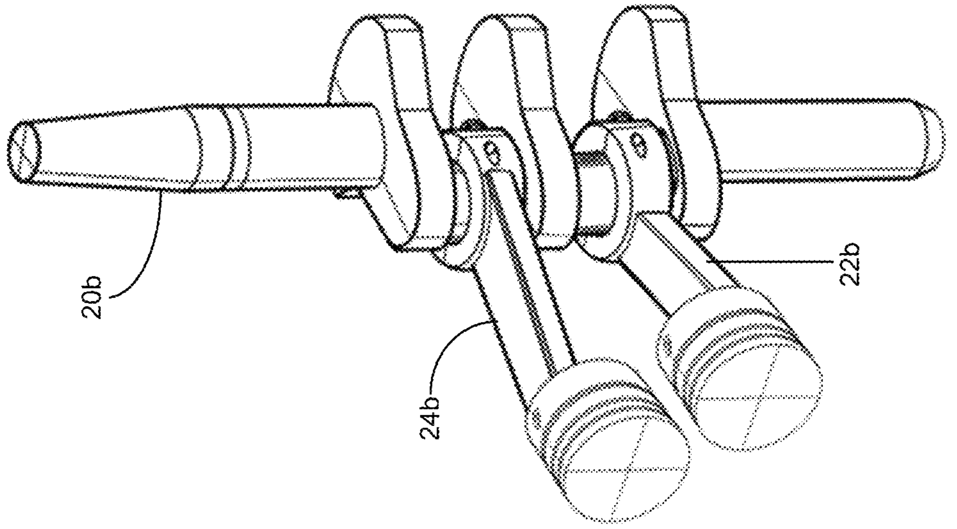
FIGS. 13 through 17 depict a variety of piston connecting rod configurations for a multiple cylinder internal combustion engine, according to a variety of example implementations.
Figure 13:
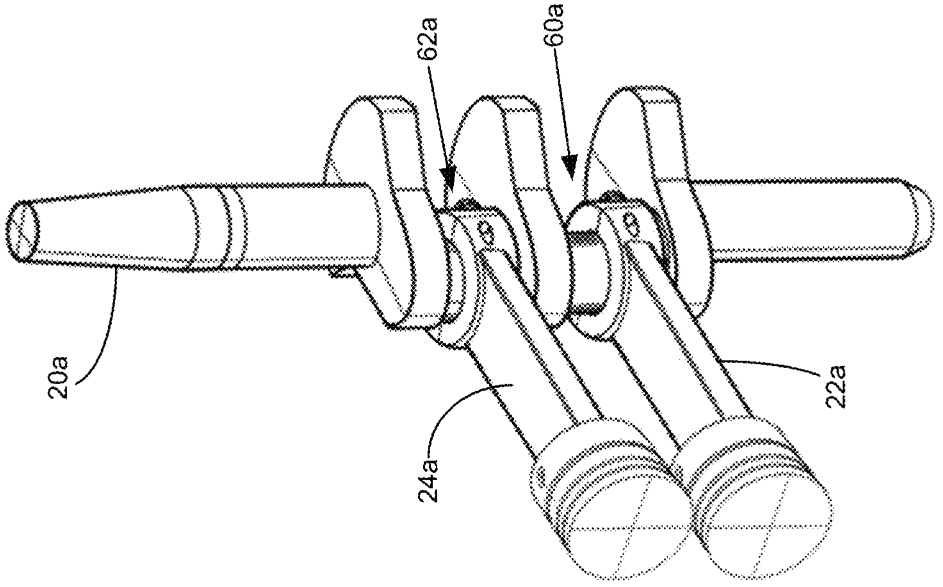

Referring to FIGS. 13 and 14, two illustrative example crankshaft and connecting rod configurations are depicted including a first crank journal and a second crank journal. As depicted in FIG. 13, according to an example implementation, the crankshaft **20*a* may include a first crank journal 60*a* and a second crank journal 62*a*. The crankshaft may be coupled to two pistons using generally straight connecting rods 22*a*, 24*a*. Referring also to FIG. 14, in another illustrative example embodiment, a crankshaft 20*b* is shown including a first and a second crank journal. As shown, the crankshaft may be coupled to two respective pistons via connecting rods 22*b*, 24*b*, in which the connecting rods may have the same configuration with one being flipped 180 degrees relative to the other. As shown, the connecting rods 22*b*, 24*b*** may each include an in-plane bend, or cock, adjacent the pistons. In some implementations, such a configuration may facilitate an offset cylinder configuration.

Figure 17:
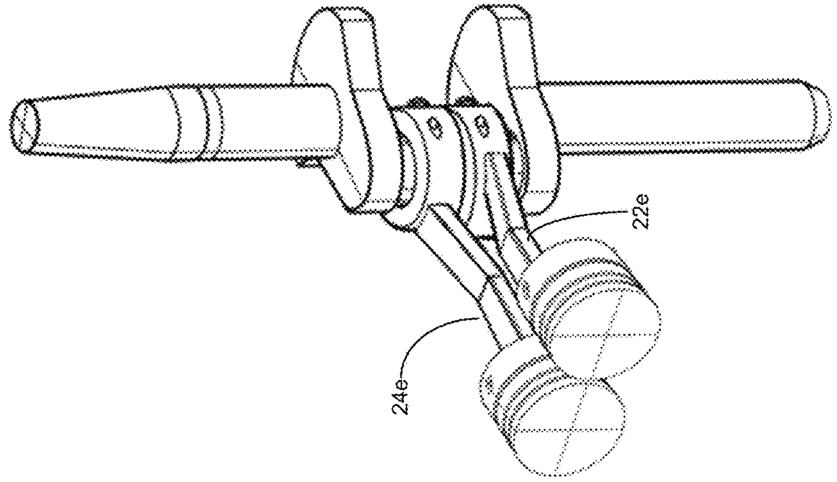
Figure 16:
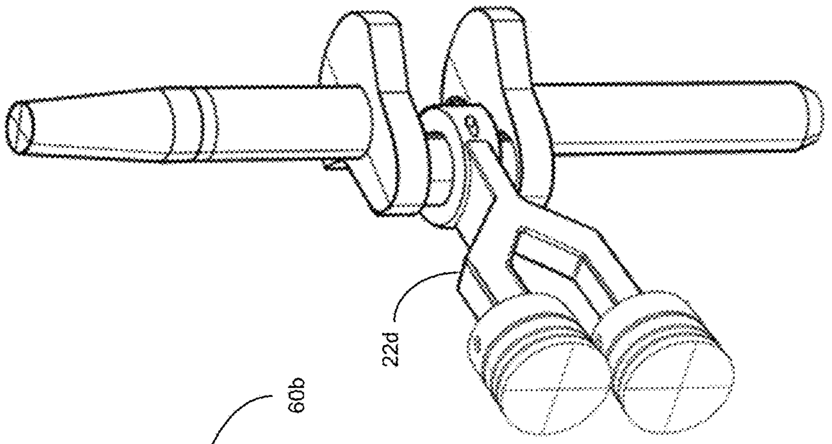
Figure 15:
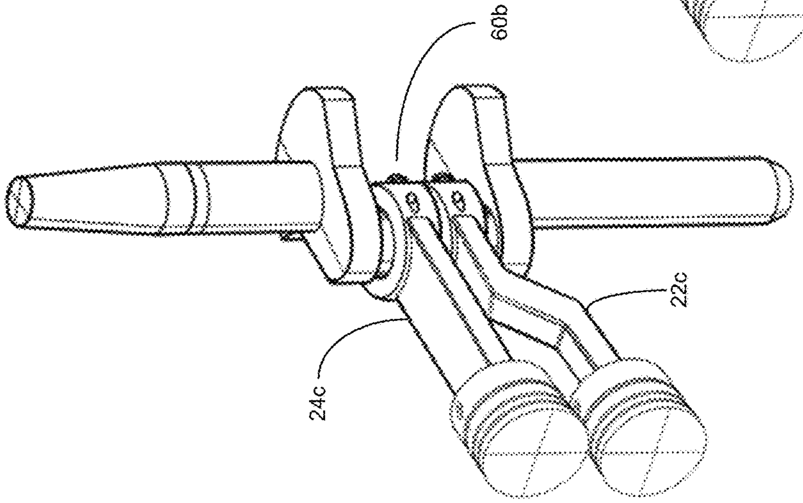

Referring to FIGS. 15 through 17 a variety of illustrative example crankshaft and connecting rod configurations are depicted through which two pistons may be coupled to the crankshaft by way of single crank journal. While the depicted illustrated embodiments depict pistons having a generally similar diameter, as discussed above, in some implementations the pistons may have different diameters. It will be appreciated that the depicted connecting rod configurations may be adapted to accommodate a variety of piston diameters and relative differences in diameters. With reference to, e.g., FIG. 15, in one implementation, the crankshaft may include a generally elongated crank journal **60*b*. Consistent with the illustrated example configuration, the first piston and the second piston may be coupled to the crank journal 60*b* via generally conventionally configured, straight connecting rods 22*c*, 24*c***. Consistent with such an implementation, the crank journal may be sufficiently long to span enough of the first cylinder and the second cylinder to provide a connecting rod bearing surface generally in the region of the central axis of the first piston and the second piston.

With additional reference to FIGS. 15 through 17, various additional connecting rod configurations are depicted that may suitably couple two pistons to a single crank journal. For example, in the illustrated example embodiment of FIG. 15, a configuration is depicted in which one of the pistons may be coupled with the crankshaft using a generally straight connecting rod **24*c*. Additionally, the other of the pistons may be coupled with the crankshaft (via the same crank journal) by way of an offset connecting rod 22***c*. As shown, the offset connecting rod 24*c* may laterally offset away from the connecting rod 22*c*. Accordingly, the offset connecting rod 22*c* may increasing the spacing between the two pistons, e.g., to provide sufficient clearance between the two pistons to allow for reciprocating movement of the two pistons in respective associated cylinders. Referring to FIG. 16, in a further illustrative example embodiment, two pistons may be coupled with a crankshaft via a single crank journal by a single forked connecting rod 22*d*. As shown, the forked connecting rod 22*d* may include a single bearing for coupling with the crank journal, and may be forked to allow the connecting rod to be connected to two separate pistons. As shown, the arms of the forked connecting rod may be sufficiently laterally offset from one another to accommodate the two pistons (e.g., the fitment of both pistons to the connecting rod, and/or reciprocating movement of the pistons in respective cylinders). While the illustrated example forked connecting rod 22*d* is shown as being generally symmetrical, e.g., with each fork of the connecting rod being laterally offset by a generally similar amount, it will be appreciated that in other implementations the two forks may be asymmetrical, e.g., with one fork being laterally offset to a greater degree compared to the other fork. In a further embodiment, one fork of the connecting rod may be generally straight, and only one fork of the connecting rod may be laterally offset to provide sufficient clearance for coupling with two pistons.

Referring also to FIG. 17, according to yet another illustrative example embodiment, two pistons may be connected to a single crank journal of a crankshaft via two separate skewed connecting rods 22*e*, 24*e*. Consistent with the depicted embodiment, the two skewed connecting rods 22*e*, 24*e* may have a generally similar configuration, with one of the connecting rods being flipped 180 degrees. Consistent with the illustrated example embodiment the skewed connecting rods 22*e*, 24*e* may each be at least partially skewed inwardly toward one another, e.g., to provide an offset configuration of the pistons relative to one another.

While several illustrative example embodiments of crankshaft and connecting rod arrangements for coupling the pistons with the crankshaft, it will be appreciated that a wide variety of additional and/or alternative configurations may equally by utilized. As such, the present disclosure should not be limited to the depicted example configurations.

Figure 18:
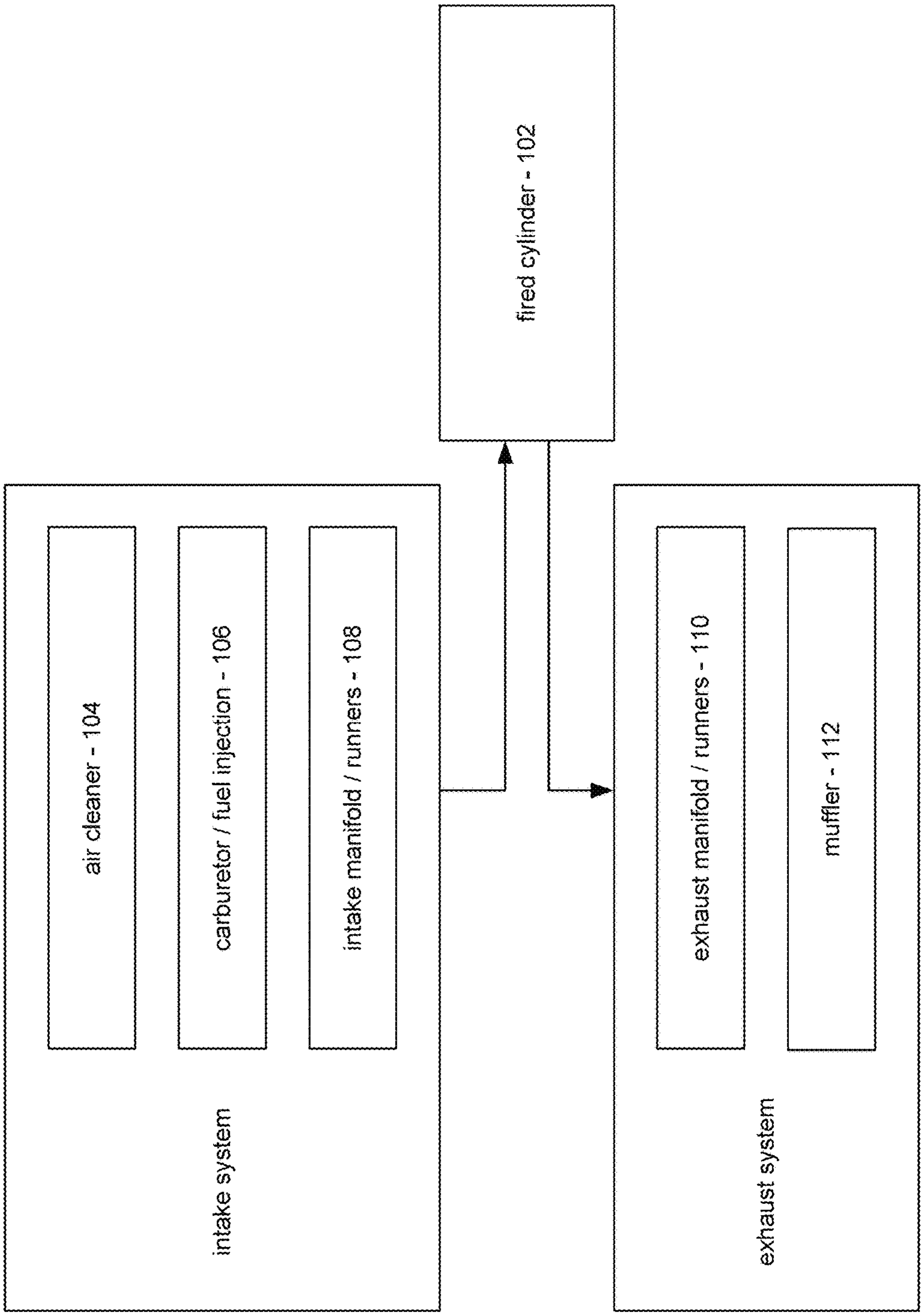
FIG. 18 is a block diagram of an intake system and an exhaust system that may be used in connection with a multiple cylinder internal combustion engine, according to an example implementation.

Referring to FIG. 18, a block diagram of a portion of an internal combustion engine 100 is depicted. As generally discussed above, the internal combustion engine 100 may include a fired cylinder 102 (e.g., the first cylinder and the second cylinder collectively), as generally described above. Additionally, as is also commonly known, and has been discussed above, the internal combustion engine 100 may generally include an intake system. The intake system may include, but is not limited to, one or more of an air cleaner 104 (e.g., which may remove at least a portion of particulate matter from intake air), a carburetor 106 and/or fuel injection system (e.g., which may disperse and/or atomize fuel in the intake air to provide a fuel-air mixture), and/or an intake manifold, runner, or the like 108 (e.g., which may include a fluid conduit for directing the fuel-air mixture to the fired cylinder and may include one or more conduits external to the engine and/or one or more fluid pathways through a portion of the engine to the intake valve of the fired cylinder). Similarly, the internal combustion engine 100 may include an exhaust system that may include, but is not limited to, one or more of an exhaust manifold, runner, or the like 110 (e.g., which may include a fluid pathway from the exhaust valve through at least a portion of the engine and/or one or more fluid conduits external to the engine), and/or a muffler 112 (e.g., which may decrease a volume of the exhaust exiting the engine). The exhaust system may, in some embodiments, include additional and/or alternative features, such as catalytic converters, oxygen sensors, and the like. The foregoing depiction is intended for the purpose of completeness, as the components of the intake system and the exhaust system may be conventional and are commonly known. As such, detailed depiction is not required for the understanding of the individual components and features.

While the foregoing description has generally pertained to an arrangement including two cylinders and two respective pistons, it will be appreciated that a greater number of cylinders and pistons may be utilized. According to various configurations, an engine may include more than two cylinders that may be fluidly coupled by a common combustion chamber, an engine may include more than one set of two cylinders fluidly coupled by respective common combustion chambers (e.g., the engine may include a first pair of cylinders fluidly coupled by a first common combustion chamber, and may include at least a second pair of cylinders fluidly coupled by at least a second common combustion chamber), and/or an engine may include at least two cylinders fluidly coupled by a common combustion chamber and one or more additional cylinders not fluidly coupled with another cylinder by a common combustion chamber.

A variety of illustrative example embodiments have been described, each including a variety of features, concepts, and arrangements. It will be appreciated that features, concepts, and arrangements disclosed in the context of one, or several, discrete embodiments are susceptible to application in other embodiments, and/or susceptible to combination with features, concepts, and/or arrangements discussed relative to multiple different embodiments. Herein, such combination of features, concepts, and arrangements from the several embodiments is expressly intended to be within the scope of the present disclosure.

A variety of feature, advantages, implementations, and embodiments have been described herein. However, it will be appreciated that the foregoing description and the depicted embodiments are only intended for the purpose of illustration and explanation, and should not be construed as a limitation on the present invention. It will be appreciated that the features and concepts associated with the various embodiments are susceptible to combination with features and concepts of other disclosed embodiments. Additionally, it will be appreciated that the concepts embodied by the description and illustration are susceptible to variation and modification, all of which are intended to be encompassed by the present invention.

What is claimed is:

1. An internal combustion engine comprising:

a first piston reciprocatingly disposed in a first cylinder;

a second piston reciprocatingly disposed in a second cylinder;

a crankshaft coupled with the first piston and the second piston for rotational motion associated with reciprocating movement of at least one of the first piston and the second piston;

a combustion chamber fluidly coupled with the first cylinder and with the second cylinder, wherein the combustion chamber includes a cavity overlying at least a portion of the first cylinder and at least a portion of the second cylinder;

an intake valve providing selective fluid communication between an intake system and the combustion chamber, the intake valve being generally centrally disposed along a split between the first cylinder and the second cylinder;

an ignition source at least partially disposed within the combustion chamber; and an exhaust valve providing selective fluid communication between an exhaust system and the combustion chamber.

2. The internal combustion engine according to claim 1, wherein the crankshaft is configured to be disposed in a generally vertical orientation during operation.

3. The internal combustion engine according to claim 1, wherein the first cylinder and the second cylinder are arranged in a parallel-inline configuration.

4. The internal combustion engine according to claim 1, wherein the first cylinder and the second cylinder are arranged in an offset configuration.

5. The internal combustion engine according to claim 1, wherein the first cylinder and the second cylinder have substantially the same diameter.

6. The internal combustion engine according to claim 1, wherein the first cylinder and the second cylinder have different diameters.

7. The internal combustion engine according to claim 1, wherein the crankshaft is coupled with the first piston via a first crank journal and coupled with the second piston via a second crank journal.

8. The internal combustion engine according to claim 1, wherein the crankshaft is coupled with the first piston and the second piston via a first crank journal.

9. The internal combustion engine according to claim 1, wherein one or more of the intake valve and the exhaust valve include overhead valves.

10. The internal combustion engine according to claim 9, wherein the intake valve is actuated by an intake rocker arm, and the exhaust valve is actuated by an exhaust rocker arm, the intake rocker arm having a greater length than the exhaust rocker arm.

11. The internal combustion engine according to claim 1, wherein a centerline of the intake valve is at least partially offset from a bore center line of the first cylinder and the second cylinder.

12. The internal combustion engine according to claim 1, wherein the exhaust valve is at least partially offset over one of the first cylinder and the second cylinder.

13. The internal combustion engine according to claim 1, wherein the ignition source includes a spark plug.

14. An internal combustion engine comprising:

a first piston reciprocatingly disposed in a first cylinder;

a second piston reciprocatingly disposed in a second cylinder;

a crankshaft coupled with the first piston and the second piston for rotational motion associated with reciprocating movement of at least one of the first piston and the second piston, the crankshaft configured to be disposed in a generally vertical orientation during operation;

a combustion chamber fluidly coupled with the first cylinder and the second cylinder;

an intake valve providing selective fluid communication between an intake system and the combustion chamber, the intake valve being generally centrally disposed within the combustion chamber relative to the first cylinder and the second cylinder and along a split between the first cylinder and the second cylinder;

an exhaust valve providing selective fluid communication between an exhaust system and the combustion chamber; and an ignition source at least partially disposed within the combustion chamber.

15. The internal combustion engine according to claim 14, wherein at least a portion of a flow pathway associated with the intake valve is disposed on a first side of an engine cylinder head, and at least a portion of a flow pathway associated with the exhaust valve is disposed on a second side of the engine cylinder head.

16. The internal combustion engine according to claim 14, wherein the intake valve is actuated by an intake rocker arm and the exhaust valve is actuated by an exhaust rocker arm, the intake rocker arm having a greater length than the exhaust rocker arm.

17. The internal combustion engine according to claim 14, wherein the intake valve and the exhaust valve are actuated by a respective intake cam lobe and an exhaust cam lobe of a common camshaft.

18. An internal combustion engine comprising:

a first piston reciprocatingly disposed in a first cylinder;

a second piston reciprocatingly disposed in a second cylinder;

a crankshaft coupled with the first piston and the second piston for rotational motion associated with reciprocating movement of at least one of the first piston and the second piston, the crankshaft configured to be disposed in a generally vertical orientation during operation;

a combustion chamber fluidly coupled with the first cylinder and the second cylinder;

an intake valve providing selective fluid communication between an intake system and the combustion chamber, the intake valve being generally centrally disposed relative to a split between the first cylinder and the second cylinder, and the intake valve being at least partially offset relative to a bore centerline of the first cylinder and the second cylinder;

an exhaust valve providing selective fluid communication between an exhaust system and the combustion chamber; and an ignition source at least partially disposed within the combustion chamber.

19. The internal combustion engine according to claim 18, wherein the combustion chamber is formed in an engine cylinder head, the engine cylinder head defining an intake pathway associated with the intake valve on a first side of the cylinder head, and defining an exhaust pathway associated with the exhaust valve on a second side of the engine cylinder head.

* * * * *